(12) United States Patent
Yu

(10) Patent No.: US 10,247,984 B2
(45) Date of Patent: Apr. 2, 2019

(54) BACKLIGHT MODULE

(71) Applicant: AmTRAN Technology Co., Ltd., New Taipei (TW)

(72) Inventor: Hung-Ta Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 74 days.

(21) Appl. No.: 15/196,051

(22) Filed: Jun. 29, 2016

(65) Prior Publication Data

US 2018/0004042 A1 Jan. 4, 2018

(51) Int. Cl.
*G02F 1/1335* (2006.01)

(52) U.S. Cl.
CPC .. *G02F 1/133605* (2013.01); *G02F 1/133603* (2013.01); *G02F 1/133611* (2013.01)

(58) Field of Classification Search
CPC ......... G02F 1/133606; G02F 1/133603; G02F 1/133605
USPC ....................................... 362/97.1
See application file for complete search history.

(56) References Cited

U.S. PATENT DOCUMENTS

2010/0232165 A1* 9/2010 Sato ...................... B60K 35/00
362/296.01
2015/0098245 A1* 4/2015 Chien .................. G02B 6/0096
362/606

* cited by examiner

*Primary Examiner* — Andrew J Coughlin
*Assistant Examiner* — Meghan K Ulanday
(74) *Attorney, Agent, or Firm* — CKC & Partners Co., LLC

(57) ABSTRACT

A backlight module including a back board, a reflector, at least one light source, at least one lens unit, and a light leakage feature is disclosed. The reflector includes a base and at least one side wall connected to the base and is disposed on the back board. The light source is disposed on the board and emits light. The lens unit is disposed on the light source and configured to diffuse the light emitted from the light source for generating light rays impinging on the side wall. The light-leakage feature is disposed at the side wall and configured to allow some of the light rays to pass through the side wall.

16 Claims, 4 Drawing Sheets

BACKLIGHT MODULE

BACKGROUND

Technical Field

The present disclosure relates to a backlight module.

Description of Related Art

With the development of technology, liquid crystal displays (LCD) have been widely used, because the LCDs have a variety of advantages, such as thin device body, low power consumption, and being free of radiation. An LCD includes a liquid crystal panel and a backlight module. As the liquid crystal panel itself does not emit light, a passive light source must be provided by the backlight module in order to normally display images. Thus, the backlight module is one of the key components of an LCD.

Generally speaking, backlight modules can be classified into two types, namely an edge type backlight module and a direct type backlight module. To provide uniform and high brightness, the edge type backlight module needs expensive optical films, which increase total cost of the display and LCD manufacturers do not prefer. On the contrary, the direct type backlight module can achieve excellent light uniformity and brightness simply through increasing light emitting diodes and attaching diffusion lenses onto the light emitting diodes. However, at the edge of the backlight module, the diffusion lenses may induce excess light luminance reflected from the reflector, which further results in display non-uniformity. Accordingly, how to improve the performance of the direct type backlight module has become an important issue in the related fields. The disclosure is proposing one kind of backlight module to resolve above problem.

SUMMARY

An aspect of the present disclosure is to provide a backlight module including a back board, a reflector, a light source, a lens unit, and a light leakage feature. The light source extends through a base of the reflector and neighbors v with a side wall of the reflector. The lens unit is disposed on the light source and can diffuse light emitted from the light source and output light rays impinging on a portion of the side wall. With the light leakage feature including holes, some of the light rays pass through the side wall, making at least one portion of the light leak out through the reflector. Therefore, the brightness at the edge of the backlight module becomes more uniform, and hence the display quality of the LCD containing the backlight module can be improved.

According to some embodiments of the disclosure, the light-leakage feature includes a plurality of holes penetrating through the side wall of the reflector, and the holes are arranged in M rows. The first row is closest to an edge of the base. The M-th row is farthest to the edge of the base. A vertical height of one of the holes in the (N+1)-th row from the base is greater than a vertical height of one of the holes in the N-th row from the base, and M is an integer greater than one and N is a positive integer smaller than or equal to (M−1).

In some embodiments, two adjacent holes in the N-th row are separated by a first transverse pitch, two adjacent holes in the (N+1)-th row are separated by a second transverse pitch, and the first transverse pitch is less than the second transverse pitch.

Furthermore a longitudinal pitch between one of the holes in the N-th row and one of the holes in the (N+1)-th row is greater than the first transverse pitch.

In some embodiments, each of the holes has a same area, and the density of the holes in the N-th row is greater than the density of the holes in the (N+1)-th row.

In different embodiments, each of the holes has a same area and the density of the holes in the 2N-th row and the density of the holes in the (2N−1)-th row are the same. Moreover, the two adjacent holes in the 2N-th row are separated by a first transverse pitch, two adjacent holes in the (2N−1)-th row are separated by a second transverse pitch, and the first transverse pitch and the second transverse pitch are the same. In such embodiments, N is a positive number smaller than or equal to M/2.

In some embodiments, a distance between a center of an outer surface of the lens unit neighboring to the side wall and a bottom of one of the holes in the first row is a first distance a vertical height measured from the base to a horizontal plane intersecting with the bottom of said one hole is a second distance and a ratio of the first distance to the second distance is in a range from 0.9 to 1.9.

In some embodiments, the holes are arranged in an inverted-trapezoidal array.

In some embodiments, the holes have different areas and the total area of the holes in the N-th row is greater than the total area of the holes in the (N+1)-th row.

In other embodiments, the holes have different areas, but the total area of the holes in the 2N-th row is the same as the total area of the holes in the (2N−1)-th row. For these embodiments, N is a positive number smaller than or equal to M/2.

DETAILED DESCRIPTION

Figure 1A:
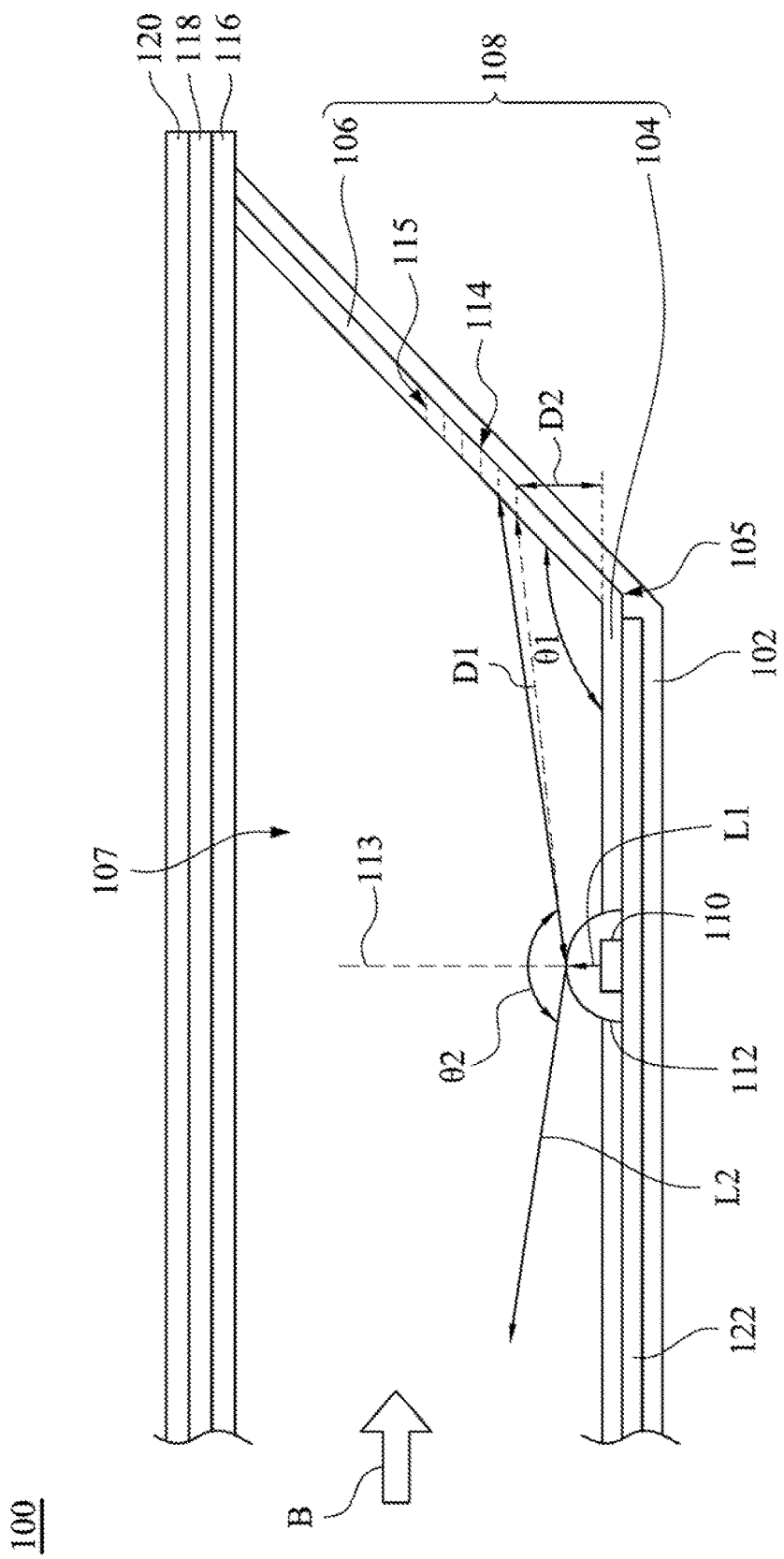
FIG. 1A is a cross-sectional view of a backlight module according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc, may be used herein to describe various elements, components, regions, layers and/or sections, these elements, components, regions, layers and/or sections should not be limited by these terms.

Figure 1B:
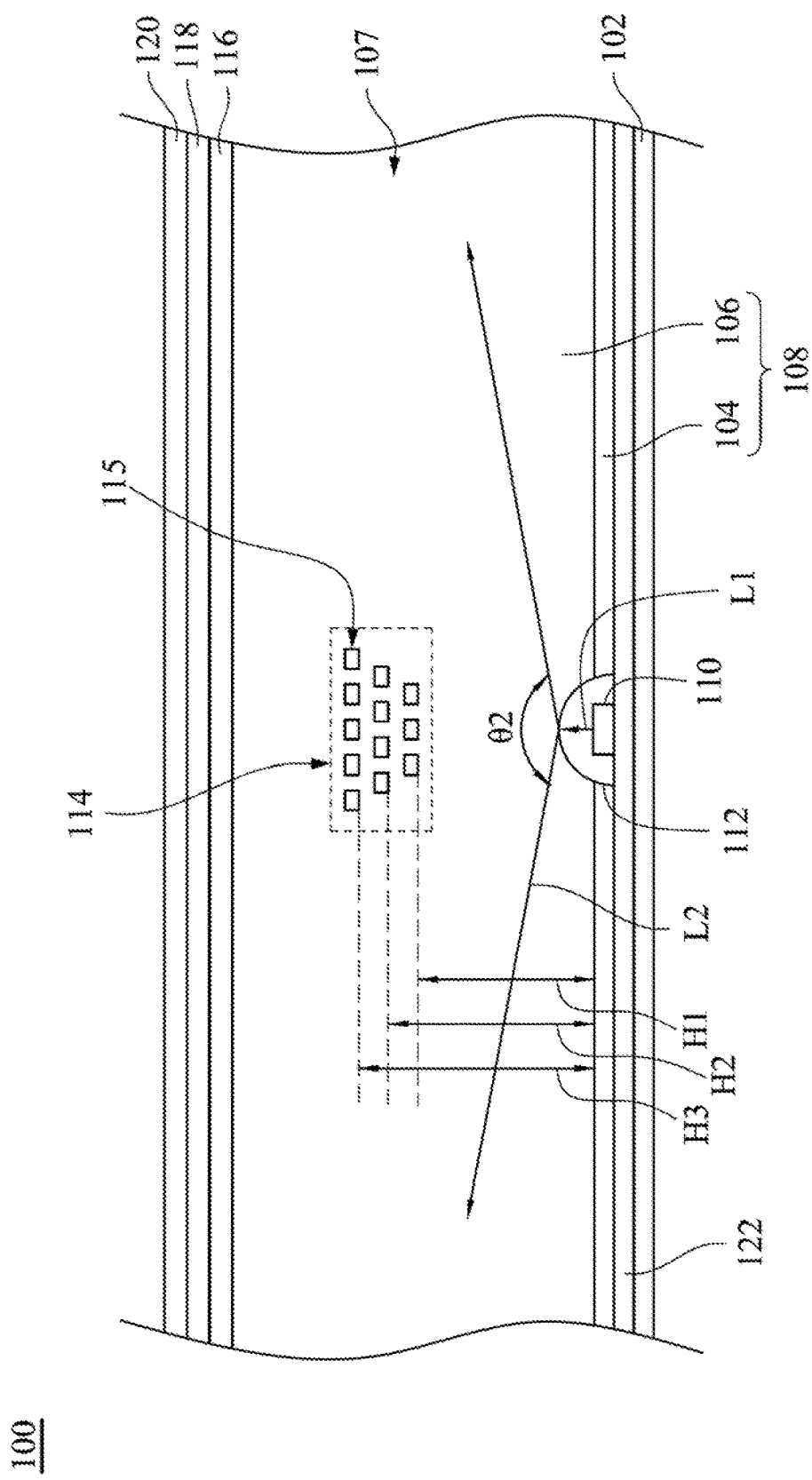
FIG. 1B is, a side view of the backlight module viewed from an arrow B illustrated in FIG. 1.

FIG. 1A is a cross-sectional view of a backlight module 100 according to a first embodiment of the present disclosure, and FIG. 1B is a side view of the backlight module 100 viewed from an arrow B illustrated in FIG. 1A. As shown in FIGS. 1A and 1B, the backlight module 100 includes a back board 102, a reflector 108, a light source 110, a lens unit 112, a light leakage feature 114, a diffuser plate 116, a prism layer 118, and a diffuser sheet 120. As can be seen in the drawings, the backlight module 100 is a direct-type backlight module.

The back board 102 may be made of metal. The reflector 108 is disposed on the back board 102 and may be made of white plastic material. The reflector 108 includes a base 104 and a side wall 106. The side wall 106 and the base 104 may be formed integrally. The side wall 106 is inclined relative to the base 104 to form an angle θ1 therebetween. For example, the angle θ1 is in a range from 90 degrees to 180 degrees. The side wall 106 also encloses the periphery of the base 104 to form a cavity 107. In some embodiments, the reflector 108 contains a reflective coating applied to a top surface of the base 104 and an inner surface of the side wall 106.

The light source 110 neighbors to the side wall 106 and is disposed on the back board 102. Moreover, the light source 110 extends through the base 104 of the reflector 108. The light source 110 is configured to emit light L1. The light source 110 can be a light-emitting diode (LED) package electrically connected to a printed circuit board (PCB) 122 disposed on the back board 102 which is opposite to the base 104. The lens unit 112 is disposed on the light source 110 and configured to diffuse the light L1 emitted from the light source 110. The light L1 is then refracted to form light rays L2 by the lens unit 112.

The lens unit 112 produces a light intensity distribution of the light rays L2. When observing any cross section of the back light module 100, the light intensity distribution is symmetric about the optical axis 113 passing through the center of the lens unit 112. Besides, the light intensity distribution reaches a maximum value at directions which shape like a cone having an apex angle θ2. This apex angle θ2 is called a diffusing angle here and in a range from 90 degrees to 160 degrees. Under this configuration, the light L1 diffused by the lens unit 112 is refracted to travel to the side wall 106. That is, some of the light rays L2 impinge on the side wall 106.

Please note that there is only one light source 110 and one lens unit 112 shown in either FIG. 1A or 1B, this is just for illustration, not to limit the numbers of components in the backlight module 100. In other embodiments, the numbers of light sources and lens units may be different.

The diffuser plate 116, the prism layer 118 and the diffuser sheet 120 are sequentially disposed over the back board 102 and the cavity 107. These optical films are used to further diffuse the light rays L2 so as to provide more uniform illumination from the backlight module 100.

The light-leakage feature 114 is disposed at the side wall 106 and configured to allow some of the light rays L2 to pass through it. In the present embodiment, the light-leakage feature 114 includes holes 115 penetrating through the side wall 106. The holes 115 are arranged in an array with three rows. Furthermore, the holes 115 can be arranged in an inverted-trapezoidal array, and a shape of at least one of the holes 115 can be circular, rectangular, triangular, or polygonal.

In terms of this configuration, some of the light rays L2 shall exit the cavity 107 through the light-leakage feature 114 and will not be reflected by the reflector 108, resulting in less light energy projected onto the liquid crystal panel at the edge of the backlight module 100.

The position or size of the light-leakage feature 114 can be adjusted according to characteristics of the lens unit 112 or the position of the light source 110. For example, the side wall 106 may be divided into a first zone and a second zone. After diffusing the light L1, the side wall 106 may be illuminated by the light rays L2 with the different intensities. For example, the first zone of the side wall 106 may be illuminated at a higher intensity (thus, the luminous intensity of the light rays L2 impinging on the first zone is higher than that on the second zone.) In case the edge of the backlight module 100 may seem too bright, we shall prevent excess light energy in the first zone from being reflected so that the brightness of the backlight module 100 is kept uniform.

Accordingly, the light-leakage feature 114 can be set and disposed at the first zone of the side wall 106 to leak excess light energy and reduce total luminance reflected from the first zone. Therefore, with using the light-leakage feature 114, the brightness at the edge of the backlight module 100 becomes more uniform.

Figure 1C:
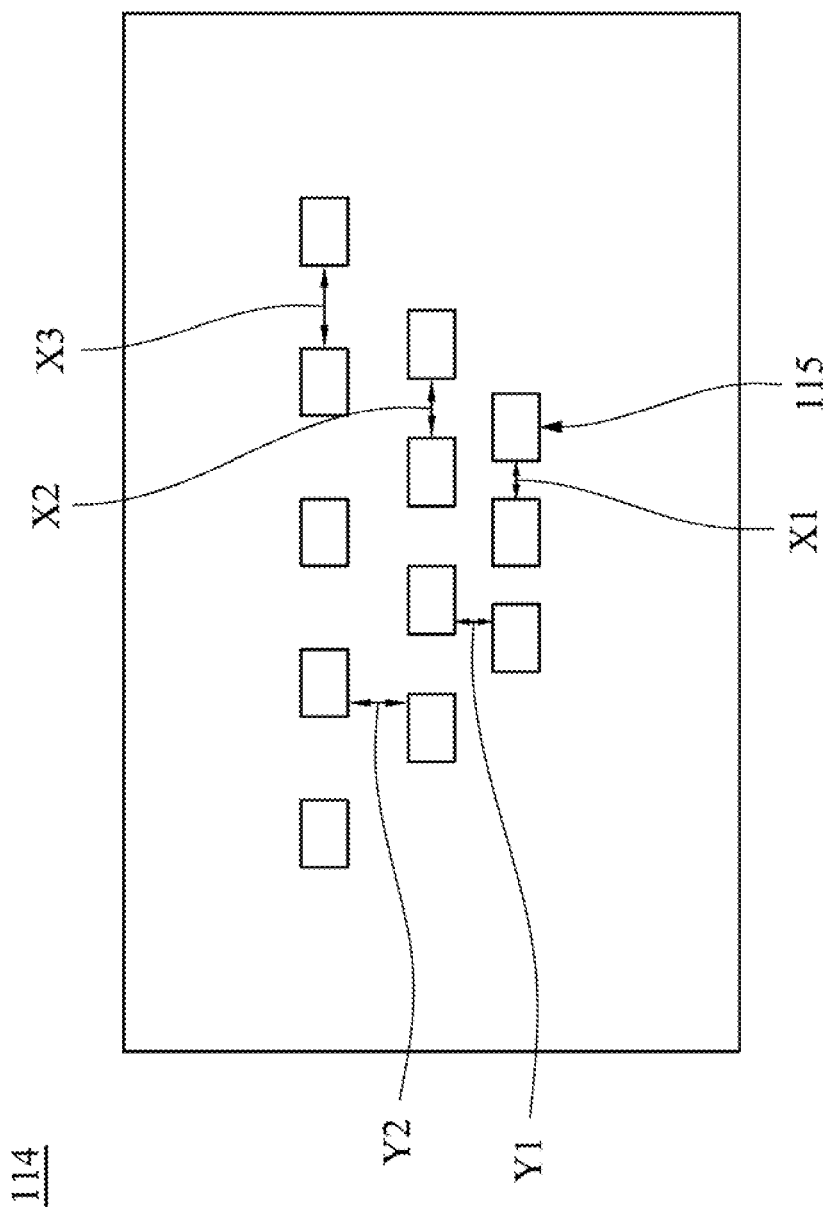
FIG. 1C is a front view of the light leakage feature illustrated in FIG. 1B.

FIG. 1C is a front view of the light leakage feature 114 illustrated in FIG. 1B. As shown in FIGS. 1A-1C, the light-leakage feature 114 comprises the holes 115 arranged in three rows. In addition, the order of the three rows is defined from bottom to top, and thus the bottom row is defined as the first row and the top row is defined as the third row. Thus, the first row is closest to an edge 105 of the base 104 that adjoins the side wall 106, and the third row is farthest to the edge 105 of the base 104. Specifically, vertical heights respectively measured from one hole 115 in the first, second and third rows to the base 104 are marked as H1, H2, and H3, where H3>H2>H1, as shown in FIG. 1B.

In some embodiments, the first row of the holes 115 of the light leakage feature 114 can be disposed according to, the diffusing angle θ2. For example, in some embodiments in which the diffusing angle θ2 is in a range from 90 degrees to 160 degrees, a distance between a center of an outer surface of the lens unit 112 neighboring to the side wall 106 and a bottom of one of the holes 115 in the first row is a first distance D1, a vertical height measured from the base 104 to a horizontal plane intersecting with (or level with) the bottom of the same hole 115 is a second distance D2, as shown in FIG. 1A. A ratio of the first distance D1 to the second distance D2 is in a range from 0.9 to 1.9.

In the arrangement of the holes 115, the number of the holes 115 in the first row is less than that in the second row, and the number of the holes 115 in the second row is less than that in the third row. In addition, in the present embodiment, all holes 115 have the same area or size.

In addition, two adjacent holes 115 in the same row are separated by a transverse pitch, and transverse pitches in different rows may be different. For example, two adjacent holes 115 in the first, second and third rows are respectively separated by first, second and third transverse pitches X1, X2, X3, where X1<X2<X3, as shown in FIG. 1C. Furthermore, the holes 115 in the adjacent rows may be separated by a longitudinal pitch, and the longitudinal pitch may be different from the transverse pitch. For example, the holes 115 in the first row and the second row are separated by a first longitudinal pitch Y1, the holes 115 in the second row and the third row are separated by a second longitudinal pitch Y2, and X1<Y1 and X2<Y2, as shown in FIG. 1C.

Under such arrangement in which all holes 115 have the same area, the density of the holes 115 in the first row is greater than the density of the holes 115 in the second row, and the density of the holes 115 in the second row is greater than the density of the holes 115 in the third row. In other words, from the first row to the third row, the density of the holes 115 in a single row decreases along the longitudinal direction. Herein, the phrase "the density of the holes" means "the number of the holes 115 per unit length". According to the densities of the holes 115, each row of the light-leakage feature 114 has a different capability of leaking excess light energy. That is, the greater the density is, the more light energy the row leaks. So the first row leaks more light energy than the second and the third rows. In this embodiment, the light leakage feature 114 is designed to locate at a position so that the maximum light intensity is refracted from the lens unit to the neighboring of the first row, according to optical characteristics of the lens unit 112 and the position of the light source. Therefore the sharp brightness at the edge of the backlight module 100 is avoided, and the brightness of the edge of the backlight module 100 becomes more uniform. However, in other embodiments, the light leakage feature 114 may be set on a place so that the maximum light intensity is refracted from the lens unit to the neighboring of the second or third row.

Furthermore, although the holes 115 illustrated in FIGS. 1B and 1C are arranged as three rows, the number of the rows can be adjusted, such as more than three rows. For example, in some other embodiments, the holes 115 can be arranged, in M rows, and the density of the holes 115 in the Nth row is greater than the density of the holes in the (N+1)-th row, in which M is an integer greater than one and N is a positive integer smaller than or equal to (M−1).

On the other hand, in some embodiments, we also can modify the total area of the holes 115 in a single row as needed and let at least two holes 115 have different areas. For example, in embodiments that the holes 115 are arranged in M rows, the holes 115 can have areas different from each other. The total area of the holes 115 in the N-th row is greater than the total area of the holes 115 in the (N+1)-th row, in which M is an integer greater than one and N is a positive integer smaller than or equal to (M−1).

Figure 2:
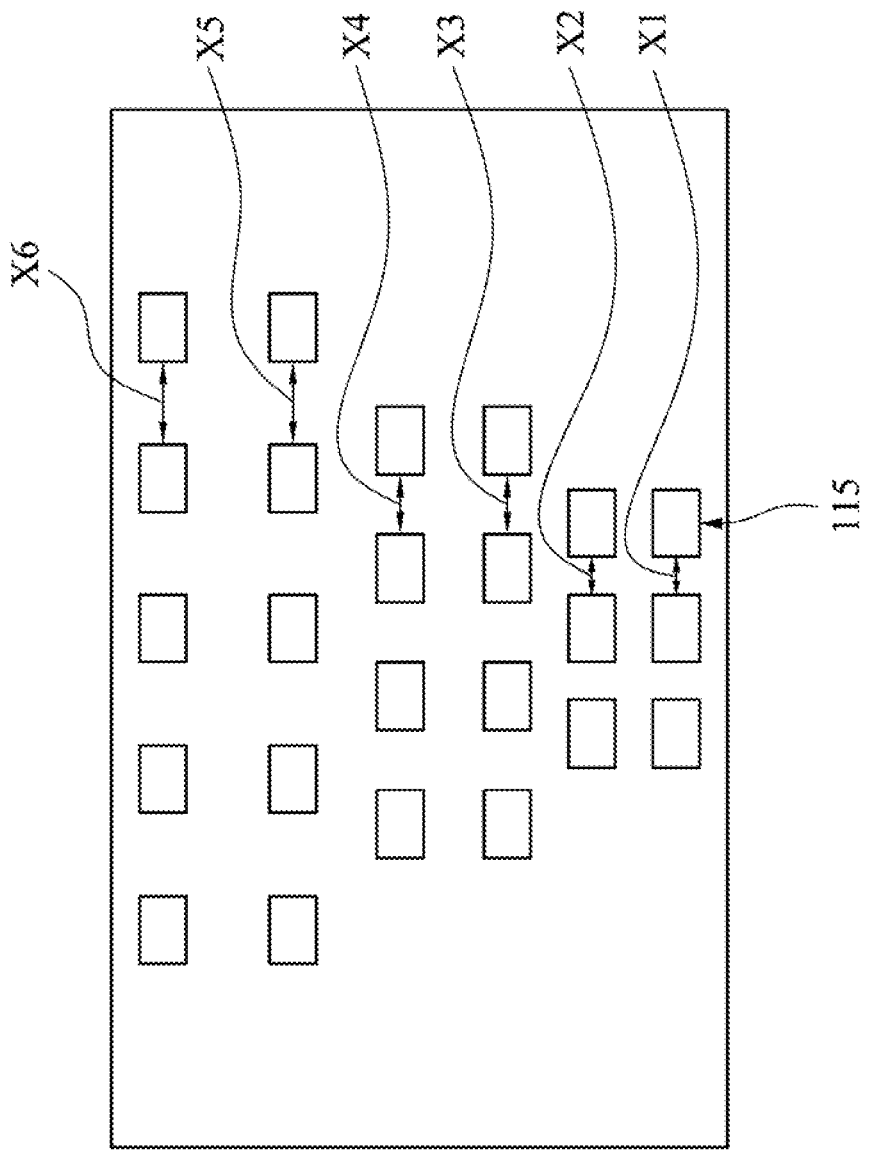
FIG. 2 is a front view of a light leakage feature of a backlight module according to a second embodiment of the present disclosure, in which the viewpoint of the light leakage feature is the same as FIG. 1C.

FIG. 2 is a front view of a light leakage feature 114 of a backlight module according to a second embodiment of the present disclosure. As shown in FIG. 2, the holes 115 in certain rows may have the same density, such that the brightness of the backlight module can be adjusted and controlled more flexibly.

In the present embodiment, the holes 115 are arranged in six rows, in which the bottom row is the first row and the top row is the sixth row. Particularly, the density is the same for each pair of adjacent rows. That is, the number of the holes in the first row and the number of the holes 115 in the second row are the same, and so on. In addition, each hole 115 has an identical area.

More, specifically, two adjacent holes 115 in the first row are separated by a first transverse pitch X1, two adjacent holes 115 in the second row are separated by a second transverse pitch X2, and the first transverse pitch X1 is the same as the second transverse pitch X2. Similarly, the reader can understand by analogy and see from the drawing that X1=X2<X3=X4<X5=X6. In this regard, the transverse pitch of the holes 115 in the 2N-th row is the same as the transverse pitch of the holes 115 in the (2N−1)-th row.

Under such arrangement, the densities of the holes 115 in the first and second rows are the same, the densities of the holes 115 in the third and fourth rows are the same, and the densities of the holes 115 in the fifth and sixth rows are the same. Thus, the density of the holes 115 in the 2N-th row and the density of the holes 115 in the (2N+−1)-th row are the same, in which N is a positive number smaller than or equal to M/2. In another aspect, the densities of the first pair of rows are greater than the densities of the second pair of rows and so on, in other words, the densities of a pair of rows are decreased from the first row to the sixth row. Similar to the first embodiment, the longitudinal pitch from the first row to the sixth row increases gradually.

On the other hand, similar to the first embodiment, the holes 115 may have different areas. For example, in embodiments that the holes 115 are arranged in M rows, the holes 115 can have areas different from each other. The total area of the holes 115 in the 2N-th row is the same as the total area of the holes 115 in the (2N−1)-th row, in which M is an integer greater than one and N is a positive integer smaller than or equal to (M−1).

According to the aforementioned, the disclosed backlight module includes the light leakage feature at its edge for eliminating excess light energy emitted from the light source. Therefore, the sharp brightness at the edge of the backlight module is avoided, and hence the brightness of the backlight module can become more uniform. In view of the results and effects achieved by the backlight nodule, the disclosed backlight module can be used to further provide users with better display quality.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. A backlight module comprising:
a back board;
a reflector disposed on the back board and comprising a base and a side wall, wherein the side wall has a lower end connected to the base and an upper end opposite to the lower end;
at least one light source disposed on the back board, protruding through the base and neighboring to the side wall;
at least one lens unit disposed on the light source and configured to output light rays by diffusing light emitted from the light source, wherein some of the light rays impinge on at least a portion of the side wall; and
a light-leakage feature disposed at the side wall and configured to allow some of the light rays to pass through the side wall, wherein the light-leakage feature comprises a plurality of holes penetrating through the side wall, and whole outline of each of the holes is separated from the lower and upper ends of the side wall wherein the side wall and the light-leakage feature are covered by the back board.

2. The backlight module of claim 1, wherein the holes are arranged in M rows, the first row is closest to an edge of the base, the M-th row is farthest to an edge of the base, wherein a vertical height of one of the holes in the (N+1)-th row from the base is greater than a vertical height of one of the holes in the N-th row from the base, and M is an integer greater than one and N is a positive integer smaller than or equal to (M−1).

3. The backlight module of claim 2, wherein two adjacent holes in the N-th row are separated by a first transverse pitch, two adjacent holes in the (N+1)-th row are separated by a second transverse pitch, and the first transverse pitch is less than the second transverse pitch.

4. The backlight module of claim 3, wherein a longitudinal pitch between one of the holes in the N-th row and one of the holes in the (N+1)-th row is greater than the first transverse pitch.

5. The backlight module of claim 2, wherein each of the holes has a same area, the density of the holes in the N-th row is greater than the density of the holes in the (N+1)-th row.

6. The backlight module of claim 2, wherein each of the holes has a same area, the density of the holes in the 2N-th row and the density of the holes in the (2N−1)-th row are the same, and N is a positive number smaller than or equal to M/2.

7. The backlight module of claim 2, wherein a distance between a center of an outer surface of the lens unit neighboring to the side wall and a bottom of one of the holes in the first row is a first distance, a vertical height measured from the base to a horizontal plane intersecting with the bottom of said one hole is a second distance, and a ratio of the first distance to the second distance is in a range from 0.9 to 1.9.

8. The backlight module of claim 2, wherein the holes are arranged in an inverted-trapezoidal array.

9. The backlight module of claim 2, wherein the holes have different areas and the total area of the holes in the N-th row is greater than the total area of the holes in the (N+1)-th row.

10. The backlight module of claim 2, wherein the holes have different areas, the total area of the holes in the 2N-th row is the same as the total area of the holes in the (2N−1)-th row, and N is a positive number smaller than or equal to M/2.

11. A backlight module comprising:
a back board;
a reflector disposed on the back board and comprising a base and a side wall connected to the base, wherein a surface of the reflector facing the back board is covered with the back board, and the side wall is in contact with the back board;
at least one light source disposed on the back board, protruding through the base and neighboring to the side wall;
at least one lens unit disposed on the light source and configured to output light rays by diffusing light emitted from the light source, wherein some of the light rays impinge on at least a portion of the side wall; and
a plurality of holes penetrating through the side wall to expose a portion of the back board, wherein the holes are between the portion of the back board and the light source.

12. The backlight module of claim 11, wherein all of the holes are wholly covered by the back board.

13. The backlight module of claim 11, wherein whole outline of each of the holes is separated from at least one edge of the side wall.

14. A backlight module comprising:
a back board;
a reflector disposed on the back board and comprising a base and a side wall connected to the base, wherein the base is enclosed by the side wall to form a cavity;
at least one light source disposed on the back board, protruding through the base and neighboring to the side wall;
at least one lens unit disposed on the light source and configured to output light rays by diffusing light emitted from the light source, wherein some of the light rays impinge on at least a portion of the side wall;
a diffuser plate disposed over the back board and having a surface facing the cavity, wherein the surface of the diffuser plate is a plane without a hole, and the side wall extends from the base to the diffuser plate, and the back board extends toward the diffuser plate to wholly cover the side wall of the reflector; and
a light-leakage feature disposed at the side wall and configured to allow some of the light rays to pass through the side wall.

15. The backlight module of claim 14, wherein the light-leakage feature comprises a plurality of holes penetrating through the side wall, and whole outline of each of the holes is separated from at least one edge of the side wall.

16. The backlight module of claim 14, wherein the light-leakage feature comprises a plurality of holes penetrating through the side wall, and all of the holes are wholly covered by the back board.

* * * * *